US006025073A

United States Patent [19]
Piret

[11] Patent Number: 6,025,073
[45] Date of Patent: Feb. 15, 2000

[54] HIGH SOLUBILITY SIZE COMPOSITION FOR FIBERS

[75] Inventor: Willy Henri Piret, Xhendelesse, Belgium

[73] Assignee: N.V. Owens-Corning S.A., Battice, Belgium

[21] Appl. No.: 09/021,163

[22] Filed: Feb. 10, 1998

Related U.S. Application Data

[63] Continuation-in-part of application No. 08/869,024, Jun. 4, 1997, abandoned.

[51] Int. Cl.$^7$ ............................... B32B 9/00; B05D 3/02; C08F 8/00
[52] U.S. Cl. ................. 428/392; 428/378; 428/375; 427/372.2; 427/384; 427/389.7; 427/389.8; 427/388.4; 525/131; 525/101; 524/494; 523/217
[58] Field of Search ..................... 525/131, 101; 524/494; 523/217; 428/378, 392, 394; 427/372.2, 389.7, 389.8, 384, 388.4, 388.5

[56] References Cited

U.S. PATENT DOCUMENTS

| | | |
|---|---|---|
| 4,338,233 | 7/1982 | Das et al. . |
| 4,338,234 | 7/1982 | Moore et al. . |
| 4,341,877 | 7/1982 | Das et al. . |
| 4,370,157 | 1/1983 | Barch et al. . |
| 4,370,439 | 1/1983 | Melle et al. . |
| 4,394,418 | 7/1983 | Temple . |
| 4,410,645 | 10/1983 | Das et al. . |
| 4,422,842 | 12/1983 | Monnet . |
| 4,435,474 | 3/1984 | Das et al. . |
| 4,477,496 | 10/1984 | Das et al. . |
| 4,727,096 | 2/1988 | Choudin . |
| 5,130,198 | 7/1992 | Swisher et al. . |
| 5,185,117 | 2/1993 | Hawley . |
| 5,247,004 | 9/1993 | Swisher et al. . |
| 5,491,182 | 2/1996 | Key et al. . |

FOREIGN PATENT DOCUMENTS

| | | |
|---|---|---|
| 0225234 | 6/1987 | European Pat. Off. . |
| 0251067 | 1/1988 | European Pat. Off. . |
| 2398702 | 2/1979 | France . |
| 2483318 | 12/1981 | France . |
| 63-265839 | 11/1988 | Japan . |
| WO 9509133 | 4/1995 | WIPO . |

OTHER PUBLICATIONS

Dieterich, Perceptions on the physical chemistry of the structure of polyurethanes, Chemical and Physical–Chemical Principles, pp. 31–38, undated.
"Impranil DLS dispersion," Bayer AG pulication 1656(N), Dec. 1982.
"Technical Data Sheet—Vinamul 88127," Vinamul Limited, May 1995.
"Baybond PU 401," Bayer AG publication, Jul. 1994.
"Baybond PU 402," Bayer AG publication, 1994.
"Neoxil 9851 PU," DSM Italia publication, 1994.
"Neoxil 9851," Safety Data Sheet, DSM Italia, 1994.
"Technical Data Sheet—Product Type: Modified Vinly Acetate Copolymer," H.B. Fuller Co., Apr. 24, 1996.
Dana, et al., "Sheet Molding Compound Glass Fibers," pp. 117–135, undated.
"X954 Continous Roving Reinforcement for Sheet Molding Compound," Owens Corning Provisional Data Sheet, undated.
Material Safety Data Sheet—Emerstat 660A, Henkel Corp. undated.
"CIE—L*A*B*—System," Report No. 11.OeLUCI 100, 1976, pp. 19–22.
"Standard Method for Computing the Colors of Ojbects by Using the CIE System," ASTM Designation: E308–85$^{E2}$, 1985, pp. 186–193.
Gerard et al., "P–4: An Industrial Preforming Technology," Owens Corning, Battice, Belgium, undated.
Nunnery, "Flow Behavior of Thermoset Polyesters and Their Effect on Process and Design," Mar., 1994, Chicago RETEC Meeting.
Material Safety Data Sheet—FC–430, 3M Nederland B.V., Mar. 1992.
Colclough, Jr., et al., "Bulk Molding Compounds;" Meyer, "Injection Molding Compounds;" and Blaetterlein et al., "Thermoset Injection Molding;" Engineering Materials Handbook, 1987, pp. 161–167 & 319–323.
Jander, "Industrial RTM—New Developments in Molding and Preforming Technologies," Advanced Composite Materials: New Developments and Applications, 1991, pp. 29–34.
"Section 1. What is SMC?," SMC Design Manual, Exterior Body Panels, Composites Institute of the Society of Plastics Industry, Inc., 1991.
Dieterich, "Introduction," Advances in Urethane Ionomers (Xiao et al., ed.), 1995, pp. 1–21.

*Primary Examiner*—Newton Edwards
*Assistant Examiner*—J. M. Gray
*Attorney, Agent, or Firm*—Inger H. Eckert

[57] ABSTRACT

A high solubility size composition is provided which may be applied to glass fibers useful for reinforcing polymeric materials. The size composition includes: a first film former comprising a polyether-based or polyester-based thermoplastic polyurethane derived from a saturated, non-crosslinkable polyether or polyester; a second film former comprising at least one ingredient selected from i) a vinyl acetate glycidyl methacrylate copolymer and ii) a mixture of a vinyl acetate glycidyl methacrylate copolymer and a vinyl acetate homopolymer; a silane coupling agent; and water. Using glass fibers coated with the high solubility size composition allows the advantageous production of low-pigmented or non-pigmented molded parts having enhanced surface appearance and color uniformity.

24 Claims, 1 Drawing Sheet

(1 of 1 Drawing Sheet(s) Filed in Color)

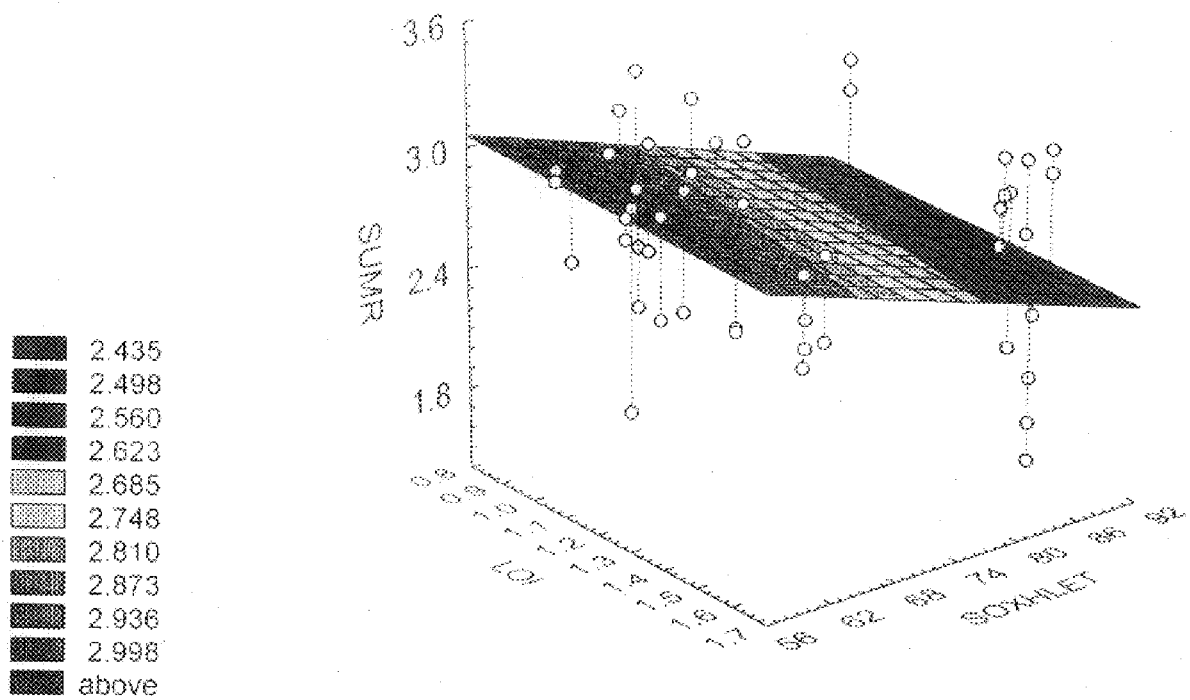

HIGH SOLUBILITY SIZE COMPOSITION FOR FIBERS

CROSS REFERENCE TO RELATED APPLICATION

This application is a continuation-in-part of U.S. application Ser. No. 08/869,024 filed Jun. 4, 1997, abandoned.

FIELD OF INVENTION

The present invention relates to a high solubility size composition for use on fibers, in particular, on glass fibers that are used as reinforcements in sheet molding compound and bulk molding compound applications. The use of such a size composition provides a smooth, uniform appearance to the resulting molded part.

BACKGROUND OF INVENTION

It is well known in the art to use glass fibers as reinforcements for polymeric materials such as composites formed by sheet molding compound (SMC) and bulk molding compound (BMC) processes. Such composites are formed using glass fiber reinforcements which provide dimensional stability and excellent mechanical properties to the resulting composites. For example, glass fibers provide dimensional stability as they do not shrink or stretch in response to changes in atmospheric conditions. Further, glass fibers have high tensile strength, heat resistance, moisture resistance, and high thermal conductivity.

Glass fibers are commonly manufactured by supplying ceramic in molten form to a bushing, drawing fibers from the bushing, and then gathering the fibers into a tow or strand. A sizing composition, or chemical treatment, is typically applied to the fibers after they are drawn from the bushing, which protects the fibers from breakage during subsequent processing and improves the compatibility of the fibers with the matrix resins that are to be reinforced. The sized strands are typically wound onto a collet, packaged, dried, and then wound together into a continuous roving. An antistatic overcoating is applied to the roving during the winding step. The roving is then subsequently chopped and contacted with a matrix resin in the sheet molding or bulk molding compound to form molded composites.

Typical sizing compositions may include coupling agents, film formers, lubricants, emulsifiers, or antistatic agents that are dissolved or dispersed (in the form of an emulsion or dispersion) in water. However, some organic solvents commonly used to emulsify or disperse film formers used in SMC size compositions, such as styrene and xylene, are flammable and pose a fire and health hazard. Lithium chloride is also commonly used in sizing compositions as an antistatic agent, but tends to adversely affect yield and is therefore undesirable for use. Accordingly, it would be desirable to use a sizing composition which does not utilize undesirable organic solvents or metal halide salts.

It would also be desirable to use a size composition which provides a smooth surface to the resulting molded part. For example, Das et al., in U.S. Pat. No. 4,338,233, describe aqueous sizing compositions for glass fibers which provide a smooth surface to molded compounds. However, such sizing compositions have a low solubility as they comprise one or more crosslinkable film forming polymers which, when crosslinked, become insoluble. Such low solubility size compositions are desirable for use in automotive or Class A applications where the resulting composite parts are painted. However, a low solubility size composition is undesirable for applications where the fibers are utilized in non-pigmented or light-pigmented sheet molded parts which are not subsequently painted because the fiber strands remain integral in the molding compound, i.e., the fibers do not sufficiently defilamentize. Thus, the fiber network is visible within the resulting molded part.

In the production of structural, low-pigmented or non-pigmented parts, the sizing composition should be highly soluble so that the individual fibers are sufficiently dispersed or wetted by the matrix resin. This promotes better fiber strand defilamentization, or strand breakup, which reduces fiber prominence and thus improves the uniformity or smooth appearance of the surface of the resulting composite. This also promotes an increased interface between the individual fibers and the matrix resin and results in better mechanical properties which are needed in structural applications.

Accordingly, a need still exists in the art for an improved size composition which exhibits high solubility, and is easy to manufacture and apply to fibers. There is a further need in the art for a size composition which improves the surface appearance of non-pigmented or low-pigmented parts formed by sheet molding and bulk molding processes, and which does not use include environmentally undesirable solvents or metal halide salts.

SUMMARY OF INVENTION

These needs are met by the present invention in which an improved size composition is provided for glass or non-glass fibers used to reinforce polymeric materials. The size composition is highly soluble, but dissolves slowly, which aids in defilamentization of the fibers during processing. This in turn reduces the visibility of fibers in the resulting molded part, providing a more homogeneous color and surface appearance. The high solubility size also improves the flow of sheet molding paste into bulk molds in injection molding applications, as will be explained in further detail below.

Further, the size composition is essentially free of environmentally unfriendly organic solvents and metal halide salts.

According to one aspect of the invention, a high solubility size composition is provided for treating glass fibers used to reinforce polymeric materials. The size composition comprises: a) a first film former comprising a polyether-based or polyester-based thermoplastic polyurethane formed from a saturated polyether or polyester which does not crosslink; b) a second film former comprising i) a vinyl acetate glycidyl methacrylate copolymer or ii) a mixture of a vinyl acetate glycidyl methacrylate copolymer and a vinyl acetate homopolymer; c) a silane coupling agent; and d) water. Preferably, the size composition has a solubility of at least 70%, more particularly, of from about 70 to about 90%, in styrene, toluene or acetone.

The film forming polyurethane in the size composition is preferably in the form of an anionic or nonionic dispersion. The polyurethane maintains the high solubility of the size composition as it is a linear polymer formed from a saturated polyether or polyester which does not crosslink. Further, the polyurethane has elastomeric properties such that it imparts softness to the fibers, making them less brittle and improving the contact of the fibers with machinery during processing.

The second film former in the size composition may be a vinyl acetate glycidyl methacrylate copolymer. The copolymer preferably has a weight average molecular weight ($M_w$) of from about 50,000 to about 150,000, for example, of about 90,000 or 100,000. Alternatively, the second film former may comprise a mixture of the vinyl acetate glycidyl methacrylate copolymer and a vinyl acetate homopolymer. Preferably, the homopolymer may replace from about 0 to about 80% by weight of the copolymer solids content in the composition. Both the polyurethane and copolymer or polyurethane and copolymer/homopolymer mixture function to protect the glass fibers from damage during processing and impart compatibility of the fibers with the matrix resin.

The silane coupling agent is preferably selected from the group consisting of aminosilanes, the reaction products of an aminosilane and maleic anhydride, vinylsilanes, ureidosilanes, and blends thereof. The size composition may also optionally include a pH adjusting agent, such as acetic acid, citric acid, sulfuric acid or phosphoric acid to adjust the pH level of the composition. In some instances, the inclusion of the stronger acids such as phosphoric, sulfuric or citric provide molded articles with whiter surfaces due to less glass fiber discoloration. Preferably, the size composition has a pH of from about 3.5 to about 6.

The amounts of the ingredients of the size composition, on a solids basis with percentages given by weight, may be 5 to 60% of the first film former, 40 to 95% of the second film former, and 1 to 10% of a coupling agent. In a preferred embodiment, the first film former (polyether-based or polyester-based thermoplastic polyurethane) is present in the sizing composition in a solids weight percent of from about 10 to about 40%, the second film former is present in a solids weight percent of from about 60 to about 85%, and the silane coupling agent is present in a solids weight percent of from about 1 to about 15%. More preferably, on the basis of total solids, the size composition comprises from about 25 to about 35% of the first film former, from about 55% to about 65% of the second film former, and from about 5 to about 10% of the silane coupling agent.

Preferably, the composition is aqueous—i.e., the solvent or carrier for the solids is water, and the size composition includes a sufficient amount of a pH adjusting agent, such as acetic, phosphoric, citric or sulfuric acid, such that the composition has a pH of from about 3.5 to about 6.

The present invention also includes a method of coating a size composition on a plurality of glass fibers used to reinforce polymeric materials. The method comprises the steps of applying a size composition as described above to a plurality of glass fibers to form coated fibers, and drying the size composition on the fibers.

The size is preferably dried on the fibers such that the size is present on the fibers in an amount of from about 0.6 to about 2.0% by weight. Such dried sized glass fiber strands can be advantageously used as reinforcements in polymeric materials such as sheet molding compounds and bulk molding compounds.

The resulting molded composite parts do not show the fiber pattern or network under the composite surface. This is particularly advantageous in SMC molding applications where the parts are not painted and a uniform surface appearance is important.

Furthermore, the size composition of the invention has excellent wetting characteristics in polyester and vinyl ester resins, which allows compounders to increase filler loadings. The size composition also advantageously has excellent mechanical properties, enhanced mold flowability, reduced fuzz and static electricity, and excellent runnability and choppability.

Accordingly, it is an object of the present invention to provide a high solubility sizing composition for fibers used in reinforcement applications that may be easily manufactured and applied to fibers, results in a composite having an improved surface appearance, and does not utilize organic solvents or metal halide salts.

BRIEF DESCRIPTION OF DRAWING

The file of this patent contains at least one drawing executed in color. Copies of this patent with color drawing(s) will be provided by the U.S. Patent and Trademark Office upon request and payment of the necessary fee.

The figure is a graph showing in color the relationship between size solubility and surface appearance in a molded part reinforced with sized fibers according to the present invention.

DETAILED DESCRIPTION AND PREFERRED EMBODIMENTS OF INVENTION

The high solubility size composition of the present invention provides many advantages over prior low and high solubility size compositions. The size composition of the present invention is highly soluble, but dissolves slowly, which allows good wet-through of the fiber strands by the matrix resin, as will be explained in further detail below. The high solubility size composition also enhances the compatibility of the fibers with the matrix resin which is to be reinforced.

Composite articles reinforced with the sized fibers of the present invention have an improved uniform, smooth surface, which is particularly advantageous for low-pigmented sheet molding compounds, such as white compounds, or non-pigmented (clear) compounds. The use of the high solubility size eliminates or reduces the need to add expensive pigments to the articles to hide the fiber network and the non-uniform color of the article. Moreover, the composite articles reinforced with fibers sized with the polyether-based polyurethane formulations of the invention also exhibit enhanced demolding characteristics.

Further, the size composition is environmentally safe as it is essentially free of harmful organic solvents and lithium chloride or other metal halide salts.

The size has also been found to improve the flow of compound paste in injection molding applications. This is due to the low dissolution speed of the size. Because the size dissolves slowly, the fibers stay together longer, i.e., they are less subject to premature defilamentization than other high solubility sizes. This improves the flow of SMC and BMC resin or paste. Consequently, the molding of a compound containing fibers coated with the size of the present invention will require less pressure to fill the mold. In addition, by improving the flow of paste, the size of the present invention allows the molding of thinner walls and more complex mold shapes using the same amount of pressure.

The size preferably has a solubility of from 70% to 90% in styrene, toluene or acetone as determined by the Soxhlet acetone solubility test as described in Dana et al., "Sheet Molding Compound Glass Fibers", PPG Industries, p. 130, the disclosure of which is hereby incorporated by reference.

As mentioned previously, the highly soluble size dissolves very slowly, which facilitates good wet-out and wet-through of the glass bundles or strands. By wet-out, it is meant the extent to which strand bundles are coated or encapsulated by the polymer matrix resin. By wet-through, it is meant the rate at which the polymer matrix resin can flow through the sized glass bundles or strands as a result of the compaction which occurs during compounding of the molding compound.

Typically, prior high solubility size compositions have had low wet-through because the size dissolves very quickly and the fiber bundles break apart and become too fine for the resin to flow through. However, the size of the present invention dissolves slowly, so the fiber bundles hold together longer, allowing the resin to flow through the spaces between individual fiber bundles. However, because of the chemical compatibility of the size, a fast wetting of the strands also occurs, which is desirable.

The size composition of the present invention comprises a polyester-based thermoplastic polyurethane, which is preferably present in the form of an anionic dispersion or a polyether-based polyurethane, which is preferably present in the form of a nonionic dispersion. Preferably, the polyurethane is formed from the reaction product of a polyether or polyester diol and a diisocyanate. Preferred diisocyanates are aliphatic diisocyanates such as isophorone diisocyanate, 4,4'-dicyclohexylmethane diisocyanate, or blends thereof. Other suitable diisocyanates include, for example, 2,6-toluene diisocyanate, 4,4'-diphenylmethane diisocyanate, 1,5-naphthalene diisocyanate, 1,6-hexamethylene diisocyanate, 4,6'-xylene diisocyanate, para-phenylene diisocyanate, cyclohexyl diisocyanate, 3,3'-tolidene 4,4'-diisocyanate, and 3,3'-dimethyl-diphenylmethane 4,4'-diisocyanate.

More particularly, the preferred polyester-based polyurethane is a polyurethane ionomer which includes pendant ionic groups such as sulfonate or carboxylate groups. The ionic groups allow the polyester-based polyurethane to form a stable dispersion in water.

A specific polyester-based polyurethane preferred for use in the present invention is IMPRANIL DLS™, an aliphatic polyester-based polyurethane available from Bayer AG, which contains about 50% by weight solids. Other suitable polyester-based polyurethanes include NEOXIL® 9851, an aliphatic-cycloaliphatic polyurethane resin in the form of a nonionic water emulsion available from DSM Savid, BAYBOND® PU 402 and BAYBOND® PU 401 (anionic polyester urethane polymer dispersions), both available from Bayer, and BAYBOND® MWH 0949 (a polyester polyurethane anionic dispersion prepared from IPDI and HDI with anionic carboxylate groups (sodium salt), having 40% solids, a pH of 8.7, and a viscosity according to DIN 53211 of 13 S) and BAYBOND® MWH 0948 (a polyester polyurethane anionic dispersion prepared from IPDI and HDI with anionic sulfonate groups (sodium salt), having 39% solids, a pH of 7.7, and a viscosity according to DIN 53211 of 12 S), which do not contain organic solvent or blocked isocyanate groups capable of crosslinking and are also available from Bayer.

A preferred polyether-based polyurethane is RET 11266, a nonionic polyether polyurethane dispersion available from Bayer which contains about 35 weight percent solids.

As the second film former, the size composition may include a random copolymer of vinyl acetate and glycidyl methacrylate. Preferably, the copolymer contains about 1 part to about 5 parts glycidyl methacrylate to 100 parts vinyl acetate (unless indicated otherwise, all parts herein are by weight). More preferably, the copolymer contains 2 parts glycidyl methacrylate to 100 parts vinyl acetate. When the glycidyl methacrylate content is low, bonding to the glass may be inhibited. Conversely, when the glycidyl methacrylate content is high, many reactions may occur in the chain resulting in decreased solubility or in insolubility. On the other hand, the preferred ratios increase the molecular weight and provide sufficient bonding to the glass while maintaining high solubility.

Copolymers suitable for the second film former include FULATEX PD-0166 and FULATEX PN-6019, which are both available from Fuller. FULATEX PN-6019 is a modified vinyl acetate copolymer in an anionic/nonionic surfactant system with the following typical properties: solids content of 53.5 to 55.5 weight %; viscosity of 100 to 600 cps; pH of 3.5 to 4.5; and a residual monomer content of 0.5% or below. An especially preferred copolymer is VINAMUL™ 88127, which is available from Vinamul U.K. or from National Starch under the product code N.S. 25-1971. This copolymer typically contains from 53.5 to 55.5% by weight solids, has a pH of 4 to 5, and a viscosity of from 100 to 400 mPa s. Analysis of VINAMUL™ 88127 and FULATEX PN-6019 gave the following results:

| Property | VINAMUL® 88127 | FULATEX PN-6010 |
|---|---|---|
| pH | 4.5 | 4.3 |
| Viscosity | 306 | 286 |
| Percent solids, by wt. | 54.1 | 54.5 |
| Particle size, nm (BI-90) | 223 | 234 |
| IV | 0.331 | 0.326 |
| Percent insoluble in acetone | 0 | 0 |
| GPC data: | | |
| $M_w$ | 90,725 | 97,800 |
| $M_n$ | 34,458 | 29,300 |
| polydispersity | 2.63 | 3.33 |
| Percent soluble in THF | 94.7 | 99.0 |
| Tg (degrees Celsius) | 25 | 24 |

Alternatively, the second film former may be a mixture of a vinyl acetate glycidyl methacrylate copolymer and a vinyl acetate homopolymer. The homopolymer may or may not be plastified. Suitable homopolymers include VINAMUL® 88154 (Vinamul U.K.) or FULATEX PD 366 (Fuller). The homopolymer can replace from about 0 to about 80% by weight of the copolymer solids content in the size composition.

The polyurethane and the copolymer or the polyurethane and the copolymer/homopolymer mixture maintains the high solubility of the size while regulating the speed of dissolution of the size. The solubility of the size and the rate of dissolution are directly affected by the molecular weight of the copolymer, the molecular weight of the homopolymer, and the weight ratio of homopolymer to copolymer. For example, a copolymer having a high molecular weight will slow the dissolution rate of the size. The speed of dissolution is also reduced when the molecular weight of the homopolymer is increased.

The vinyl acetate glycidyl methacrylate copolymer has a high dissolution speed. However, when the copolymer is mixed with a polyurethane having a lower dissolution speed or when mixed with a higher molecular weight homopolymer, the dissolution speed is reduced without affecting the final solubility of the size. This provides an improvement over prior size compositions which include crosslinkable film formers. While the crosslinking reaction reduces the dissolution speed, the solubility is also reduced, which is undesirable.

The size composition also preferably includes a silane coupling agent. The silane coupling agent functions to enhance the adhesion of the film forming copolymer to the glass fibers and to reduce the level of fuzz, or broken fiber filaments, during processing. This enhanced adhesion is believed to occur due to a reaction between the coupling agent and epoxy groups in the copolymer. Suitable coupling agents include, but are not limited to, aminosilanes, the reaction product of an aminosilane and maleic anhydride, vinylsilanes, ureidosilanes, and blends thereof. A preferred coupling agent is A1100, which is commercially available from OSI Specialties and contains 52% by weight active silane solids after hydrolysis. Also suitable for use is a hydrolyzed A1100 solution in water, which is commercially available from OSI Specialties under the designation VS142 (40% solution) or from Huils under the designation A1151 (40% solution).

The size composition further comprises an amount of water sufficient to dissolve or disperse the active solids for coating. Preferably, the weight percentage as total solids of the first film former, second film former, and coupling agent in the composition is from about 4 to about 16 weight percent.

The size composition may optionally include a pH adjusting agent, such as an acid, in an amount sufficient to provide the size composition with a pH of from about 3.5 to about 6. Useful acids include, for example, acetic, citric, sulfuric, and phosphoric acids, however, the stronger acids (e.g., citric acid and stronger) such as phosphoric have been found to provide less fiber discoloration, and hence greater whiteness in molded parts. Accordingly, a preferred acid is phosphoric acid.

The size composition may also optionally include a processing aid, such as a lubricant, to facilitate manufacturing. For example, a small amount, preferably no more than about 0.14% by weight of the size composition, of a conventional water-based lubricant may be employed. Exemplary lubricants that may be optionally added to the size compositions of the invention include one or more of the following: a nonionic surfactant, e.g., a block copolymer of ethylene oxide and propylene oxide such as PLURONIC L101 (available from BASF) or SYNPERONIC PE/IL101 (available from ICI), or octylphenoxypolyethoxyethanol such as TRITON X100 (available from Rohm and Haas); a polyvinyl pyrrolidone, e.g., a LUVISKOL K grade (available from BASF); an imidazoline, e.g., an alkylimidazoline derivative such as TEGO cationic softener (available from Th.Goldschmidt AG); or a polyethyleneimine polyamide salt, e.g., EMERY 6760 (available from Henkel Corp.).

The size composition is preferably prepared by diluting and mixing each of the polyurethane, copolymer and coupling agent separately with water to form a premix prior to being combined with the other components in a main mixing tank. A suitable amount of an acid is added to the coupling agent premix or to the combined mixture as needed to reach a final pH of from 3.5 to 5. After all of the premixed materials are added to the main mix tank, a sufficient amount of water is added to obtain a total solids content in the composition of from about 4 to about 16 % weight percent. The size composition may be prepared using suitable equipment and techniques known in the art.

As mentioned previously, the size is preferably applied to the fibers and dried such that the size is present on the fibers in an amount of from about 0.6 to about 2.0% by weight based on fibers. This is measured by the loss on ignition (LOI) of the rovings. By loss on ignition, it is meant the reduction in weight of the fibers after heating by burning or pyrolyzing to remove the organic size from the fibers.

To achieve the desired solids content on the fibers, the amount of water added to the dilute the size mixture may be varied. For example, to obtain an LOI of 1.2% on the fibers, the following size composition may be used (percents are based on the total weight of the composition): 4.8% by weight (6,675#) of IMPRANIN DLS™ the first film former; 17.5% by weight (24,483 g) of VINAMUL® 88127 as the second film former; 1.2% by weight (1,691 g) of Al 100 as the silane coupling agent; 0.6% by weight (829 g) acetic acid; and 75.9% by weight (106,322 g) water. An exemplary composition having an 0.6% LOI value contains: 1.50% by weight (6,675 g) IMPRANIL DLS™; 5.50% by weight (24,483 g) VINAMUL® 88127; 0.38% by weight (1,691 g) Al 100; 0.19% by weight (829 g) acetic acid; and 92.43% by weight (411,322 g) water. To obtain an LOI of 2.0%, a composition may be prepared containing 6.1% by weight (6,675 g) of IMPRANIL DLS™; 22.3% by weight (24,483 g) VINAMUL® 88127; 1.5% by weight (1,691 g) of A 100; 0.8% by weight (829 g) acetic acid; and 69.4% by weight (76,322 g) water.

The size composition is preferably applied to fibers having a diameter of from about 9 to about 20 microns, with fibers of from about 14 to about 16 microns in diameter being more preferred.

The preferred roving yield, or tex, for bundles of the sized fibers is from 15 to 500 tex, with 75 tex being especially preferred. Tex is a measure of weight per unit length of the roving expressed in grams per kilometer. Tex measurements are used to ascertain whether consistent glass loadings have been achieved during the compounding process, and involve splitting the strands as they are wound with the use of a comb. The number of bundles of strands separated by the comb is equal to the number of splits. For example, a strand exiting the bushing at 300 tex being separated into 4 splits produces a strand made of 4 bundles of 75 tex each. A strand of 400 tex can be separated into 6 splits to give bundles of approximately 67 tex per bundle. It should be appreciated that the tex of the strands formed from the bushing is dependent on the bushing type and the fiber diameter.

Values of from 1200 up to 9600 tex are preferred for the assembled strands, with 2400 to 4800 tex being more preferred. Such tex values allow a sufficient repartition of the glass on the SMC line. Higher tex strands are difficult to chop and result in non-homogeneous repartition of the glass. Lower tex strands have better fiber dispersion, but are more expensive to produce and manipulate (they require more cakes per SMC line including creel and feeding pipes). Values of 2400 and 4800 tex are standard values. In some cases, such as BMC preparation, 9600 tex can be used.

The smaller (finer) the bundle tex, the better the glass repartition in the SMC molding. The mechanical properties are also improved with finer bundle tex. The most common tex are in the range of from 37.5 to 75 tex.

While the size composition is described as being applied to glass fibers, it should be appreciated that the size may also be applied to preformed fibers (fibers which were previously formed off-line), synthetic fibers (non-glass fibers) such as KevlarO, carbon or graphite fibers, silicon carbide (SiC) fibers, polymeric fibers (preformed or continuously formed), and other non-glass fibers.

The size composition may be applied to the fibers by conventional methods known in the art. Generally, the size composition is applied to the fibers as they exit the bushing using an applicator roller as described in U.S. application Ser. No. 08/311,817, filed Sept. 26,1994, the disclosure of which is hereby incorporated by reference.

In the production of the glass fibers, the fibers may be split into strands at a gathering shoe and then wound onto a collet into forming packages or cakes. The packages are preferably cured in an oven at a temperature of from 100° C. to 130°

C. for a period of 12 to 18 hours to remove water and cure the size on the surface of the fibers. The packages are then put into a creel and the strands are wound together into a continuous roving.

Preferably, an antistatic agent is applied to the roving during the winding step. Suitable antistatic agents include a mix of EMERSTAT™ 6660, a quaternary ammonium antistat available from Henkel, and FC-430, which is a product containing fluoroaliphatic polymeric esters available from 3M. The antistatic agent is preferably applied to the roving at about 0.001 to about 0.3% by weight.

Optionally, the wound roving may be subjected to a suitable postovening treatment to improve properties without substantially affecting solubility. For example, to improve run-out, the wound, antistat-treated roving may be positioned unpacked on a shelf (to allow hot air to circulate easily around it), and then placed in a ventilated oven and heated at a temperature of about 130° C. for a period of from about 2 to about 8 hours, with the precise conditions being suitably selected for the particular roving bobbin size and tex. Such treatment is preferably conducted to improve run-out at the end of the bobbin. The rovings are then allowed to cool.

The rovings may then be appropriately packaged and shipped to a customer for the desired SMC, BMC or other processing into a composite part. A non-pigmented SMC formulation or paste which may be used for processing with the sized glass fibers of the present invention may include an unsaturated polyester resin as the matrix, a thermoplastic low-profile additive such as polyethylene which reduces the resin contraction during polymerization, a filler such as calcium carbonate, and a thickener such as magnesium oxide. The paste may also include an organic peroxide such as tert-butylperbenzoate which initiates crosslinking polymerization of the matrix resin, and a demolding agent such as zinc stearate.

The paste is deposited onto a moving carrier film and sized glass fiber rovings are fed into a chopper and chopped to a length which may vary from about 6 mm to about 50 mm. The chopped fibers are dropped onto the resin paste, then a second carrier film is coated with resin paste and laid (resin side down) on top of the chopped fibers, and the glass fibers are wet out with the resin paste. The glass fibers are compounded with the paste in a proportion of about 30% by weight glass and about 70% by weight paste. The SMC sheet is then taken up on a storage roll. When the SMC is ready for molding, the material is cut into pieces of the desired size and shape, and the cut pieces are then assembled into a charge pattern of a shape and volume which will fill the mold cavity. The charge is then placed in the mold, which generally comprises a matched set of steel dies, and compressed. The SMC is then cured, and the mold is opened and the resulting part removed.

The SMC molded parts which utilize the sized fibers of the present invention as reinforcements include molded electrical cabinets which house electrical networks, bathtubs, and structural parts for automobiles. Rovings of sized fibers are useful in a wide variety of SMC applications, such as valve covers, semi-structural and structural applications, and electrical housing and business equipment, and are especially advantageous in light-pigmentable SMC formulations, such as sanitary and appliance equipment.

A bulk molding compound (BMC) formulation which may be used with the sized fibers of the present invention includes a polyester resin, a low profile thermoplastic resin, a pigment, a crosslinking agent, a catalyst, a thickening agent, a mold lubricant, and powdered mineral fillers. In a BMC process, the compounds may be prepared by mixing the BMC resin matrix with the sized chopped fibers using a sigma blade mixer. Alternatively, the roving may be pulled through a dip tank of BMC resin and then chopped. The resulting material is then ready for molding. Typical bulk molding compounds are processed by compression, transfer or injection molding. In BMC molding, an important characteristic is the flow of the BMC material into the mold. As mentioned previously, the size composition of the present invention improves the flow of the matrix resin or paste such that less pressure may be used to fill the mold.

BMC molded parts which utilize the sized fibers of the present invention as reinforcements include headlamp reflectors, iron casings, toasters, electrical boxes, and switch bases.

It should be appreciated that while the invention is preferably directed to a size for SMC and BMC applications, the size may also be used in other applications such as Zanella molding compounds (ZMC), dough molding compounds (DMC), knead molding compounds (KMC), thick molding compounds (TMC), continuously impregnated compounds (CIC), granular molding compounds (GMC), nodular molding compounds (NMC), and pellet molding compounds (PMC). Due to its slow dissolution and good wet-through, the size composition may also be used for reaction injection molding (RIM). The size may also be used in resin transfer molding applications, particularly the Owens Corning process described in "Industrial RTM— New Developments in Molding and Preforming Technologies" (Advanced Composite Materials: New Developments and Applications Conference Proceedings, Detroit, Mich. Sept. 30—Oct. 3, 1991), the disclosure of which is hereby incorporated by reference.

In order that the invention may be more readily understood, reference is made to the following examples, which are intended to be illustrative of the invention, but are not intended to be limiting in scope.

EXAMPLE 1

A size composition in accordance with the present invention was prepared by diluting 6.675 kg IMPRANIL DLS™ (Bayer) in 42 liters of demineralized water. The solution was mixed for 10 minutes, transferred to a main mix tank and flushed with 2.8 liters of water. Then 24.483 kg of VINAMUL® 88127 (Vinamul U.K.) was diluted in 42 liters of demineralized water, mixed for 10 minutes and transferred to the main tank and flushed with 2.8 liters of water. Next, 1691 grams of A-1100 (OSI Specialties) was diluted in 28 liters of demineralized water and stirred for 15 minutes. Glacial acetic acid was then progressively added to the coupling agent solution in 28-gram increments, with 10 minutes of agitation between additions, until the mixture reached a pH of 4 to 5. When such a pH was reached, the mixture was transferred to the main mix tank and flushed with 2.8 liters of water.

The prepared size composition was applied to several samples of 16-m diameter fibers as they exited a bushing using a conventional in-line graphite applicator roller. A resulting 400-tex fiber strand was then split into six strands which were wound onto a collet to form a single forming cake. The forming cake was then cured in a conventional ventilated oven for 17 hours at 130° C. Six such forming cakes were then placed on a creel and the strands were wound together into a 2400-tex continuous roving. An antistatic agent in a water solution was applied to the roving at a level of 0.09% solids on the strand. The antistatic agent was prepared according to the following composition:

| Material | % Active Solids | % by Weight | kg/100 liters |
|---|---|---|---|
| EMERSTAT 6660 | 100 | 40.82 | 40.746 |
| FC-340 | 100 | 0.42 | 0.419 |
| Demineralized Water | 0 | 58.76 | 58.662 |

The rovings were then tested for tex, loss on ignition (LOI), and solubility. The results are shown below in Table I.

TABLE I

| Sample | Tex (g/km) | LOI (%) | Solubility (%) |
|---|---|---|---|
| 1 | 2496 | 1.22 | 77.95 |
| 2 | 2493 | 1.32 | 75.36 |
| 3 | 2483 | 1.32 | 76.66 |

EXAMPLE 2

A size composition was prepared as in Example 1. The prepared size was then conventionally applied to 14-m diameter fibers as they exited, unsplit, from a bushing. In this example, a 300-tex strand was not split to enhance the size of the bundle (and, consequently, its effect on the visual appearance of the molded panel) and to allow easier colorimetry testing. Eight forming cakes were assembled into a 2400-tex roving. The 2400-tex rovings were then fed via polyethylene pipes, spaced at 50 mm, to a commercially available Finn & Fram, Inc., chopper of a conventional SMC impregnation machine. The chopping length was set to 25 mm. The glass was compounded with non-pigmented general purpose SMC paste of the following composition:

| Ingredient | Technical Description | Parts | % | Weight (g) |
|---|---|---|---|---|
| SYN.0020-N-2 (SYNOLITE 0020-N-2 available from DSM) | unsaturated polyester resin | 100 | 32.18 | 13,000 |
| TBPB (available from Laporte) | tert-butylperbenzoate | 2 | 0.64 | 260 |
| Coathylene (H-grade, available from Plast-Labor SA (Hoechst)) | polyethylene | 10 | 3.22 | 1,300 |
| Zn stearate (available from Oleofina) | zinc stearate | 4 | 1.29 | 520 |
| BLP/2 (available from OMYA S.A) | 99.75% calcium carbonate (5 m avg. diameter) | 100 | 32.18 | 13,000 |
| MAGLIDE D (available from Merck) | MgO, thickener | 1.5 | 0.48 | 195 |

The chopper speed and carrier speed were adjusted to compound the glass with the paste in a proportion of 30% by weight glass and 70% by weight paste. The resulting prepreg, which had a surface weight of 5 kg/m$^2$, was maturated for 3 days at 30° C.

Panels were then molded by superimposing three layers of prepreg material in a 500T Battenfeld press so that 70% of the projection of the mold surface was covered. The part, a rectangular box measuring 40 cm by 60 cm by 9 cm with a part thickness of 3.5 mm, was molded at a pressure of 80 to 90 kg/cm$^2$ for a cycle time of 3 minutes. The bottom of the box was cut out and used for mechanical testing and surface quality measurements as described below.

Each panel was measured for color homogeneity using a spectrophotometer using color parameters L, a, b (coordinates based on CIE-L*a*b* system; ASTM method E 308). For each molded specimen, 20 measurements were recorded randomly on the surface of the specimens. The ranges of variation of the 3 color parameters L, a, b were then calculated statistically. The ranges of variation were small when the panel had a homogeneous surface appearance and were high when the panel did not have a homogeneous surface appearance. The ranges of variation of the color parameters were then consolidated into one value with the addition of the 3 color parameter range of variation, represented by the sum R=L variation range+a variation range+b variation range. The graph shown in the figure illustrates the dependency of the color homogeneity on the quantity of size on the strand (LOI), and the degree of solubility (determined by Soxhlet extraction). As can be seen, a higher solubility corresponds to a more homogeneous surface for the resulting molded part.

EXAMPLE 3

Another embodiment of a size composition in accordance with the present invention was prepared by diluting 4.918 kg IMPRANIL DLS™ in 30 liters of demineralized water. The solution was mixed for 10 minutes, transferred to a main mix tank and flushed with 3 liters of water. Then 18.907 kg of VINAMUL® 88127 was diluted in 30 liters of demineralized water, mixed for 10 minutes and transferred to the main tank and flushed with 3 liters of water. Next, 1246 grams of A-1100 was diluted in 20 liters of demineralized water and stirred for 15 minutes. Then 551 grams of maleic anhydride was added to the coupling agent solution and stirred for 15 minutes. Glacial acetic acid was then progressively added to the coupling agent solution in 28-gram increments, with 10 minutes of agitation between additions, until the mixture reached a pH of 4 to 5. When such a pH was reached, the premix was transferred to the main mix tank and flushed with 3 liters of water. Finally, water was added to the main tank to bring the total volume of the mix to 140 liters.

In the manner described in Example 1, the prepared size composition was applied to 16-micron fibers, and the resulting 400-tex fiber strand was split into six strands, which were formed into a 2400-tex roving. Three samples of rovings were thus prepared and tested, producing the following results (values are averages for the three samples): LOI =1.22%; solubility=86%.

EXAMPLE 4

An additional embodiment of a size composition in accordance with the present invention was prepared by diluting 4.918 kg IMPRANIL DLS in 20 liters of demineralized water. The solution was mixed for 10 minutes, transferred to a main mix tank and flushed with 3 liters of water. Then 18.040 kg of VINAMUL® 88127 was diluted in 20 liters of demineralized water, mixed for 10 minutes and transferred to the main tank and flushed with 3 liters of water. Next, 415 grams of A-i 100 was diluted in 20 liters of demineralized water and stirred for 15 minutes. Then 203 grams of glacial acetic acid was added to the coupling agent solution and stirred for 15 minutes. Additional glacial acetic acid was then progressively added to the coupling agent solution in 28-gram increments, with 10 minutes of agitation between additions, until the mixture reached a pH of 4 to 5. When such a pH was reached, the mixture was transferred to the main mix tank and flushed with 3 liters of water. Next, 332 grams of glacial acetic acid was diluted in 30 liters of demineralized water. Then, 830 grams of A174 (gamma-methacryloxypropyltrimethoxysilane, available from OSI Specialties) was added and stirred for 30 minutes. Once the solution was clear, it was transferred to the main tank and flushed with 3 liters of water. Finally, water was added to the main tank to bring the mix to a total of 140 liters.

In the manner described in Example 1, the prepared size composition was applied to 16-micron fibers, and the resulting 400-tex fiber strand was split into six strands, which were formed into a 2400-tex roving. Three samples of rovings were thus prepared and tested, producing the following results (values are averages for the three samples): LOI =1.28%; solubility =80%.

EXAMPLE 5

A further embodiment of a size composition in accordance with the present invention was prepared by diluting 4.918 kg IMPRANIL DLS™ in 30 liters of demineralized water. The solution was mixed for 10 minutes, transferred to a main mix tank and flushed with 3 liters of water. Then 6.013 kg of VINAMUL® 88127 and 12.367 kg of FULATEX PD-8000 (Fuller) were diluted successively together in 30 liters of demineralized water, mixed for 10 minutes, transferred to the main tank and flushed with 3 liters of water. Next, 1246 grams of A-1100 was diluted in 20 liters of demineralized water and stirred for 15 minutes. Then 611 grams of glacial acetic acid was added to the coupling agent solution and stirred for 15 minutes. Additional glacial acetic acid was then progressively added to the coupling agent solution in 28-gram increments, with 10 minutes of agitation between additions, until the mixture reached a pH of 4 to 5. When such a pH was reached, the mixture was transferred to the main mix tank and flushed with 3 liters of water. Finally, water was added to the main tank to complete the mix to 140 liters.

EXAMPLE 6

Another embodiment of a size composition in accordance with the present invention was prepared by diluting 4.918 kg IMPRANIL DLS™ in 30 liters of demineralized water. The solution was mixed for 10 minutes, transferred to a main mix tank and flushed with 3 liters of water. Then 6.013 kg of VINAMUL® 88127 and 12.367 kg of FULATEX PD-366 (Fuller) were diluted successively together in 30 liters of demineralized water, mixed for 10 minutes, transferred to the main tank and flushed with 3 liters of water. Next, 1246 grams of A-1100 was diluted in 20 liters of demineralized water and stirred for 15 minutes. Then 611 grams of glacial acetic acid was added to the coupling agent solution and stirred for 15 minutes. Glacial acetic acid was then progressively added to the coupling agent solution in 28-gram increments, with 10 minutes of agitation between additions, until the mixture reached a pH of 4 to 5. When such a pH was reached, the mixture was transferred to the main mix tank and flushed with 3 liters of water. Finally, water was added to the main tank to complete the mix to 140 liters total.

EXAMPLE 7

An additional embodiment of a size composition in accordance with the present invention was prepared by diluting 6.148 kg BAYBOND® MWH 0949 (Bayer) in 30 liters of demineralized water. The solution was mixed for 10 minutes, transferred to a main mix tank and flushed with 3 liters of water. Then 18.040 kg of VINAMUL® 88127 was diluted in 30 liters of demineralized water, mixed for 10 minutes and transferred to the main tank and flushed with 3 liters of water. Next, 1246 grams of A-1100 was diluted in 20 liters of demineralized water and stirred for 15 minutes. Glacial acetic acid was then progressively added to the premix of A-1100 in 28-gram increments, with 10 minutes of agitation between additions, until the mixture reached a pH of 4 to 5. When such a pH was reached, the premix was transferred to the main mix tank and flushed with 3 liters of water. Finally, water was added to the main tank to bring the total volume of the mix to 140 liters.

In the manner described in Example 1, the prepared size composition was applied to 16-micron fibers, and the resulting 400-tex fiber strand was split into six strands, which were formed into a 2400-tex roving. Three samples of rovings were thus prepared and tested, producing the following results (values are averages for the three samples): LOI 1.17%; solubility=82%.

EXAMPLE 8

A further embodiment of a size composition in accordance with the present invention was prepared by diluting 6.305 kg BAYBOND® MWH 0948 (Bayer) in 30 liters of demineralized water. The solution was mixed for 10 minutes, transferred to a main mix tank and flushed with 3 liters of water. Then 18.040 kg of VINAMUL® 88127 was diluted in 30 liters of demineralized water, mixed for 10 minutes and transferred to the main tank and flushed with 3 liters of water. Next, 1246 grams of A-1100 was diluted in 20 liters of demineralized water and stirred for 15 minutes. Glacial acetic acid was then progressively added to the premix of A-1100 in 28-gram increments, with 10 minutes of agitation between additions, until the mixture reached a pH of 4 to 5. When such a pH was reached, the premix was transferred to the main mix tank and flushed with 3 liters of water. Finally, water was added to the main tank to bring the total volume of the mix to 140 liters.

In the manner described in Example 1, the prepared size composition was applied to 16-micron fibers, and the resulting 400-tex fiber strand was split into six strands, which were formed into a 2400-tex roving. Three samples of rovings were thus prepared and tested, producing the following results (values are averages for the three samples): LOI=1.19%; solubility=79%.

EXAMPLE 9

A further embodiment of a size composition in accordance with the present invention was prepared by diluting 10.150 kg RET 11266 (Bayer) in 20 liters of demineralized water. The solution was mixed for 10 minutes, transferred to a main mix tank and flushed with 2.8 liters of water. Then 3.673 kg of VINAMUL® 88127 was diluted in 21 liters of demineralized water, mixed for 10 minutes and transferred to the main mix tank and flushed with 2.8 liters of water. Then 8.984 kg of VINAMUL® 88154 was diluted in 21 liters of demineralized water, mixed for 10 minutes and transferred to the main mix tank and flushed with 2.8 liters of water. Next, 1,549 kg of A-1100 was diluted in 28 liters of demineralized water and stirred for 15 minutes. Glacial acetic acid was then progressively added to the A-1100 premix in 28 gram increments, with 10 minutes of agitation between additions, until the mixture reached a pH of 4 to 5. When such a pH was reached, the A-1100 premix was transferred to the main mix tank and flushed with 2.8 liters of water. Finally, water was added to the main mix tank to bring the total volume of the mix to 140 liters.

In the manner described in Example 1, the prepared size composition was applied to 14 micron fibers, and the resulting 300-tex fiber strand was split into 4 strands, which were wound onto a collet to form a forming cake, cured in an oven at elevated temperature, and formed into a 2400-tex roving. Two forming cakes were prepared and cured, three samples of rovings from each forming cake were prepared and tested to determine their surface moisture content, the amount of the size composition on the fiber (expressed in terms of the loss on ignition or "LOI"), and the solubility of the sizing after solvent extraction with acetone. The results of these tests are set forth in Table II

TABLE II

| Oven Cure | TEX (g/km) | % H2O | % LOI | % Soluble |
|---|---|---|---|---|
| 18 H/115° C. | 2537 | 0.0646 | 1.13 | 72.71 |
| | 2530 | 0.0447 | 1.08 | 75.48 |
| | 2548 | 0.0502 | 1.05 | 74.11 |
| 15 H/130° C. | 2530 | 0.0545 | 1.15 | 75.95 |
| | 2521 | 0.0571 | 1.19 | 75.02 |
| | 2514 | 0.0497 | 1.12 | 76.21 |

EXAMPLE 10

A size composition was produced as in Example 9, which was coated on glass fibers having an average diameter of 16 microns. The resulting 400 tex fiber strand was split into 6 strands which were formed into a 2400 tex roving.

The roving was chopped into segments, compounded with a typical low profile formulation for electrical applications containing black pigment, and molded into composite panels in the manner described in Example 2. The results of physical property measurements for the molded composites made from these fibers (Sample A) and from a commercially available fiber (Sample B) are set forth in Table II. The reported values are the average between measurements taken parallel to the direction of flow and perpendicular to the direction of flow.

TABLE III

| SAMPLE | B | A |
|---|---|---|
| GLASS CONTENT (%) | 24.4 | 24.5 |
| Tensile (MPA) DIN 53455* | 78.5 | 80.9 |
| Modulus (MPA) DIN 53455 | 10040 | 9555 |
| Elongation (%) DIN 53455 | 1.5 | 1.7 |
| Flexural ASTM D790** | 181 | 173 |
| Modulus ASTM D790 | 9790 | 9778 |
| Deflexion ASTM D790 | 3.2 | 3.2 |
| Charpy unnotched (KJ/M$^2$)/ISO R179*** | 66 | 70 |

*speed = 10 meters/min
**L = 16 × thickness
***D/X = 20

The above description of the invention has been made to illustrate preferred features and embodiments of the invention. Other embodiments and modifications will be apparent to skilled artisans through routine practice of the invention. Thus, the invention is intended not to be limited to the features and embodiments described above, but to be defined by the appended claims and equivalents thereof.

What is claimed is:

1. A size composition for treating glass fibers useful to reinforce polymeric materials comprising:
   a) a first film former comprising a polyether-based thermoplastic polyurethane formed from a saturated polyether which does not crosslink;
   b) a second film former comprising i) a vinyl acetate glycidyl methacrylate copolymer or ii) a mixture of a vinyl acetate glycidyl methacrylate copolymer and a vinyl acetate homopolymer;
   c) a silane coupling agent; and
   d) water.

2. The size composition of claim 1 having a solubility in styrene, toluene or acetone of at least about 70%.

3. The size composition of claim 1 in which said polyurethane comprises a reaction product of said polyether and a diisocyanate.

4. The size composition of claim 1 in which said vinyl acetate glycidyl methacrylate copolymer has a weight average molecular weight of from about 50,000 to about 150,000.

5. The size composition of claim 1 in which said polyurethane is in the form of a nonionic dispersion.

6. The size composition of claim 1 in which said silane coupling agent is selected from the group consisting of aminosilanes, the reaction products of aminosilanes and maleic anhydrides, vinylsilanes, ureidosilanes, and blends thereof.

7. The size composition of claim 1 having a pH of from about 3.5 to about 6.

8. The size composition of claim 7 further comprising an acid selected from the group consisting of acetic acid, citric acid, sulfuric acid and phosphoric acid.

9. The size composition of claim 7 further comprising phosphoric acid.

10. The size composition of claim 1 wherein the first film former is present in amount, based on total solids, of from about 10 to about 40% by weight, the second film former is present in an amount, based on total solids, of from about 60 to about 85% by weight, and the silane coupling agent is present in an amount, based on total solids, of from about 1 to about 15% by weight.

11. A fiber product comprising at least one glass fiber coated with a dried size composition as defined in claim 1.

12. A molded product comprising a polymeric material reinforced with a plurality of glass fibers coated with a dried size composition as defined in claim 1.

13. An aqueous size composition for treating glass fibers useful to reinforce polymeric materials comprising:
   a) from about 10 to about 40% by weight based on total solids of a first film former comprising a polyether-based thermoplastic polyurethane;
   b) from about 60 to about 85% by weight based on total solids of a second film former comprising i) a vinyl acetate glycidyl methacrylate copolymer or ii) a mixture of a vinyl acetate glycidyl methacrylate copolymer and a vinyl acetate homopolymer; and
   c) from about 1 to about 15% by weight based on total solids of a silane coupling agent;
      wherein the size composition has a solubility in styrene, toluene or acetone of at least 70%.

14. The size composition of claim 13 further comprising an amount of an acid such that said composition has a pH of from about 3.5 to about 6.

15. The size composition of claim 13 wherein said polyether-based thermoplastic polyurethane has been formed from a saturated polyether.

16. The size composition of claim 13 further comprising a lubricant.

17. A fiber product comprising a glass fiber coated with a dried size composition as defined in claim 13.

18. A molded product comprising a polymeric material reinforced with a plurality of glass fibers coated with a dried size composition as defined in claim 13.

19. The size composition of claim 14 further comprising phosphoric acid.

20. A method of preparing sized glass fibers for reinforcing polymeric materials, comprising the steps of:

applying a size composition to a plurality of glass fibers to form coated fibers, said size composition comprising a) a first film former comprising a polyether-based thermoplastic polyurethane formed from a saturated polyether which does not crosslink, b) a second film former comprising i) a vinyl acetate glycidyl methacrylate copolymer or ii) a mixture of a vinyl acetate glycidyl methacrylate copolymer and a vinyl acetate homopolymer, c) a silane coupling agent, and d) water; and drying said size on said fibers to form size-coated fibers.

21. The method of claim 20 in which said size composition is present on said coated fibers in an amount of from about 0.6 to about 2.0% by weight as measured by loss on ignition.

22. The method of claim 20 further comprising the step of:

applying an antistatic coating to said size-coated fibers.

23. The method of claim 22 wherein said antistatic coating is applied to said fibers in an amount of about 0.001 to about 0.3% by weight.

24. The method of claim 20 further comprising the steps of:

a) winding said size-coated fibers into a roving;

b) applying an antistatic agent to said roving during said winding step; and, c) heating the wound roving in an oven.

* * * * *